(12) United States Patent
Hayashi et al.

(10) Patent No.: US 7,739,151 B2
(45) Date of Patent: Jun. 15, 2010

(54) RESERVATION OF DIGITAL MEDIA ITEMS

(75) Inventors: Joe Hayashi, Piedmont, CA (US); Kevin Saul, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1241 days.

(21) Appl. No.: 11/022,152

(22) Filed: Dec. 21, 2004

(65) Prior Publication Data
US 2006/0095339 A1    May 4, 2006

Related U.S. Application Data

(60) Provisional application No. 60/622,178, filed on Oct. 25, 2004.

(51) Int. Cl.
*G06Q 30/00* (2006.01)
(52) U.S. Cl. ...................................................... 705/26
(58) Field of Classification Search ................ 705/26, 705/27, 50, 52
See application file for complete search history.

(56) References Cited

U.S. PATENT DOCUMENTS

| | | | | |
|---|---|---|---|---|
| 6,248,946 | B1 * | 6/2001 | Dwek ........................... | 84/609 |
| 2002/0040326 | A1 * | 4/2002 | Spratt .......................... | 705/26 |
| 2002/0049844 | A1 * | 4/2002 | Nishikawa ................... | 709/225 |
| 2002/0194619 | A1 * | 12/2002 | Chang et al. ................. | 725/134 |
| 2003/0061105 | A1 * | 3/2003 | Morris et al. ................. | 705/26 |
| 2004/0080780 | A1 * | 4/2004 | Fallon ......................... | 358/1.15 |
| 2004/0086120 | A1 * | 5/2004 | Akins et al. .................. | 380/240 |
| 2005/0010648 | A1 * | 1/2005 | Ramaswamy et al. ....... | 709/217 |
| 2005/0075093 | A1 * | 4/2005 | Lei et al. ..................... | 455/412.1 |
| 2005/0102191 | A1 * | 5/2005 | Heller .......................... | 705/26 |
| 2005/0125831 | A1 * | 6/2005 | Blanchard .................... | 725/81 |
| 2005/0138654 | A1 * | 6/2005 | Minne ......................... | 725/31 |
| 2006/0078112 | A1 * | 4/2006 | Meyers ........................ | 380/201 |

OTHER PUBLICATIONS

Unknown author, "Tag to Download Initiative," Music Week, Tonbridge, UK, Sep. 18, 2004, p. 2.*
"Ring Tones and Other Exciting Musical Opportunities", www.attwireless.com, Oct. 5, 2004, 2 pages.
"MMode Phones and How to Access Your Music and Ring Tones", www.attwireless.com, Oct. 5, 2004, 3 pages.
Peter Lewis, Two New Ways to Buy Your Bits—Dec. 31, 2003, Fortune Magazine, cnnmoney.printthis.clickability.com, Oct. 5, 2004, 4 pages.
Alex Veiga, "AT&T Wireless Launching Music Service", Associated Press, biz.yahoo.com, Oct. 5, 2004, 2 pages.
U.S. Appl. No. 10/910,555, filed Aug. 2, 2004, entitled: "Method and System for Sharing Information about Media Items".

* cited by examiner

*Primary Examiner*—Amee A Shah

(57) ABSTRACT

Techniques for interacting with an online media store using a first device to identify a digital media item of interest to a user of the first device, using the first device to store an interest indicator for the digital media item of interest at the online media store, and subsequently interacting with the online media store using a second device to purchase or preview the digital media item of interest as identified by the interest indicator. Additionally, ring tones and graphics associated with the digital media item of interest can also be purchased.

30 Claims, 9 Drawing Sheets

RESERVATION OF DIGITAL MEDIA ITEMS

CROSS REFERENCE TO RELATED APPLICATIONS

This application claims priority under 35 U.S.C. §119(e) to U.S. Provisional Patent Application No. 60/622,178, filed Oct. 25, 2004, and entitled "RESERVATION OF DIGITAL MEDIA ITEMS", which is hereby incorporated by reference herein.

BACKGROUND OF THE INVENTION

1. Field of the Invention

The present invention relates to the purchasing of digital media items and, more specifically, to the use of a portable wireless device to identify and/or purchase digital media items.

2. Description of the Related Art

Digital media items are typically played by using either a digital media player or a media management application operating on a personal computer. While there is some overlap between media players and personal computers, for example, "hip tops", which have many of the features of both, each device type has limitations. For instance, media players typically lack effective means to connect to high-speed computer networks and usually cannot read media files from removable storage media such as compact disks (CDs), while personal computers generally are not very portable when compared to most digital media players.

Currently, online purchase of digital media items is limited to personal computers. There are various reasons for this limitation, including a lack of functionality in an average media player. For instance, many media players lack sufficiently sophisticated user interfaces, have limited processing or storage capabilities, and lack network connectivity.

Another type of electronic device that has limited media file playback capability is a portable wireless device, which includes cellular phones and wireless personal digital assistants (PDAs). However, while some of these devices are capable of playing media files, they generally lack access to computer networks and/or lack the wireless bandwidth necessary to transfer media files, which are typically several megabytes (MB) in size.

There are situations when it would be convenient for the user of a portable wireless device to be able to purchase digital media items from an online media store in spite of the device's limitations. For instance, a consumer might hear a song on the radio and desire to purchase it right away. If the consumer does not have current access to a personal computer, then it will not be possible to purchase the song immediately. Unfortunately, by the time the consumer is able to get to his computer, there is a significant chance he will have forgotten about the song. This is a problem for both the consumer, who does not get the desired song, and the seller of music, who loses out on the sale of the song. Thus, there is a need for techniques to enable purchase of digital media items using portable wireless devices.

SUMMARY OF THE INVENTION

The invention pertains to techniques for identifying and/or purchasing digital media items by using a wireless non-transfer device (a 'portable wireless device'). These techniques can allow a user of a portable wireless device to identify a digital media item on an online media store and mark it for download. The digital media item may then be downloaded at a later time when the user is able to connect to the online media store with a transfer device, typically a personal computer (e.g., a 'host computer'). The digital media item can be purchased using either the non-transfer device or the transfer device. Digital media items available for purchase and download can include a variety of media file types, including audio (e.g., MP3, MP4, AAC, WAV, etc.), video (AVI, QUICKTIME™, etc.), electronic book (eBook), as well as others. Digital media items can include music singles and music videos, for example. Additionally, ring tones and graphics associated with the digital media item can also be purchased.

The invention can be implemented in numerous ways, including as a method, system, device, apparatus, graphical user interface, or computer readable medium. Several embodiments of the invention are discussed below.

In one embodiment of the invention, a portable wireless device interacts with an online media store via a network, typically a cellular network, to select a digital media item of interest, which is marked for later review or purchase. Subsequent to this interaction, a second device, for example a personal computer connected to the Internet, is used to review the marked digital media item, or to download the marked digital media item if it has already been purchased.

In another embodiment of the invention, a list of available digital media items is obtained from an online media store and browsed using a browser application (e.g., a WAP browser) or a media management application (MMA) running on a portable wireless device. The browser or MMA is then used to purchase one or more digital media items from the online media store. The purchased media items are marked for later download to a second device, for example a personal computer connected to the Internet.

Depending on the bandwidth available and the media playback capabilities of the portable wireless device, digital media items downloaded to the portable wireless device can include telephone ring-tones, music files, art graphics, and video files.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques for identifying and/or purchasing digital media items by using a wireless non-transfer device (a 'portable wireless device'). These techniques can allow a user of a portable wireless device to identify a digital media item on an online media store and mark it for download. The digital media item may then be downloaded at a later time when the user is able to connect to the online media store with a transfer device, typically a personal computer (e.g., a 'host computer'). The digital media item can be purchased using either the non-transfer device or the transfer device. Digital media items available for purchase and download can include a variety of media file types, including audio (e.g., MP3, MP4, AAC, WAV, etc.), video (AVI, QUICKTIME™, etc.), electronic book (eBook), as well as others. Digital media items can include music singles and music videos, for example. Additionally, ring tones and graphics associated with the digital media item can also be purchased.

A transfer device, in the context of this invention, may be defined as an electronic device that can be used to transfer or obtain digital media items. Transfer may occur over a network connection, by direct link using a cable, or by copying from removable media such as a CD-ROM. Typical examples of transfer devices are media players and personal computers. A transfer device may or may not be capable of media playback.

Non-transfer devices, in the context of this invention, are cellular phones, personal digital assistants (PDAs), and other similar portable wireless devices that have wireless access. Typically, non-transfer devices are not used for storage, transfer, or playback of digital media items, although many such devices do have limited playback capabilities.

Media management applications (MMAs) or media players, in the context of this invention, include software applications that typically incorporate the ability to do one or more of the following: play, browse, organize, purchase, and/or transfer digital media items between devices, including to portable media players (e.g., MP3 or MPEG4 players).

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
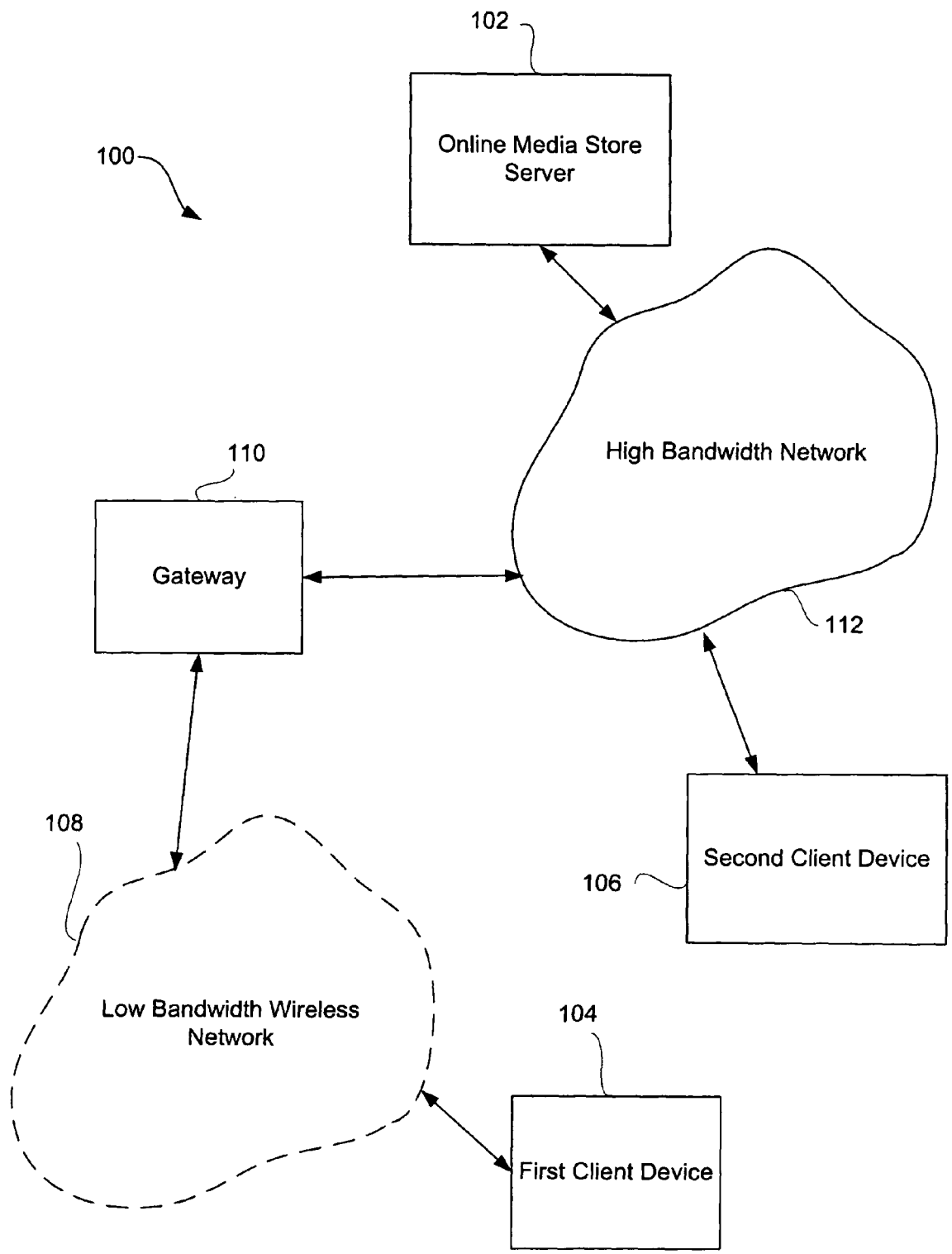
FIG. 1 is a block diagram of a multi-device media purchase system according to one embodiment of the invention.

FIG. 1 is a block diagram of a multi-device media purchase system 100 according to one embodiment of the invention. The multi-device media purchase system 100 includes an online media store server 102. The online media store server 102 stores a plurality of available digital media items that can be purchased via client devices over a network. As shown in FIG. 1, the multi-device media purchase system 100 includes a first client device 104 and a second client device 106. The first client device 104 is a wireless device that couples to a low-bandwidth network 108 (e.g., wireless network). The low-bandwidth network 108 in turn couples to a gateway 110 that links the low-bandwidth network 108 to a high-bandwidth network 112 (e.g., wired network). As an example, the high-bandwidth network 112 can generally be referred to as a wide area network or the Internet. The second client device 106 couples to the high-bandwidth network 112. Additionally, the online media storage server 102 couples to the high-bandwidth network 112. In one implementation, the low-bandwidth network 108 can refer to a low data-bandwidth wireless network, such as current cellular telephone networks, and the high-bandwidth network 112 can refer to high data-bandwidth networks, namely, wired networks, such as Ethernet, Gigabit Ethernet, and fiber optic, as well as wireless networks such as IEEE 802.11(a)(b) or (g) (WiFi), IEEE 802.16 (WiMax), and Ultra-Wide Band (UWB).

According to the invention, a user at the first client device 104 can interact with the online media store server 102 via the low-bandwidth network 108 and the high-bandwidth network 112. In this way, the user at the first client device 104 can browse, preview, mark or purchase one or more digital media items available on the online media store server 102. The mark or purchase operations usually require the user to first identify one or more digital media items of interest. The identified digital media item(s) of interest can then be marked (for review or for purchase) or purchased. Typically, however, the first client device 104 is a device that does not desire to have the identified digital media item(s) downloaded from the online media store server 102 to the first client device 104 via the low-bandwidth network 108, but rather to another device. Downloading of digital media items over the low-bandwidth network 108 can be slow and costly given that the file size of the digital media items tend to be large.

In some embodiments, the first client device does not want to receive the selected digital media item at all because it is not capable of playing or otherwise utilizing the selected digital media item. Nevertheless, the user, or an affiliated user, at the second client device 106 is interested in having the selected digital media item stored to the second client device 106. Accordingly, the selected digital media item that was selected through use of the first client device 104, can be subsequently downloaded from the online media store server 102 to the second client device 106. Typically, the connection of the second client device 106 to the online media store server 102 is via the high-bandwidth network 112, which offers sufficient bandwidth capacity. As such, the invention offers a convenient way for the user at the first client device 104 to indicate (e.g., bookmark) an interest in at least one digital media item available on the online media store server 102, yet defers the downloading of the data for the selected digital media item until the user (or an affiliated user) couples to the online media store server 102 via the second client device 106 and indicates a desire to receive the download. The purchase for the digital media item, if required, can be processed by the user at either the first client device 104 or the second client device 106.

Figure 2A:
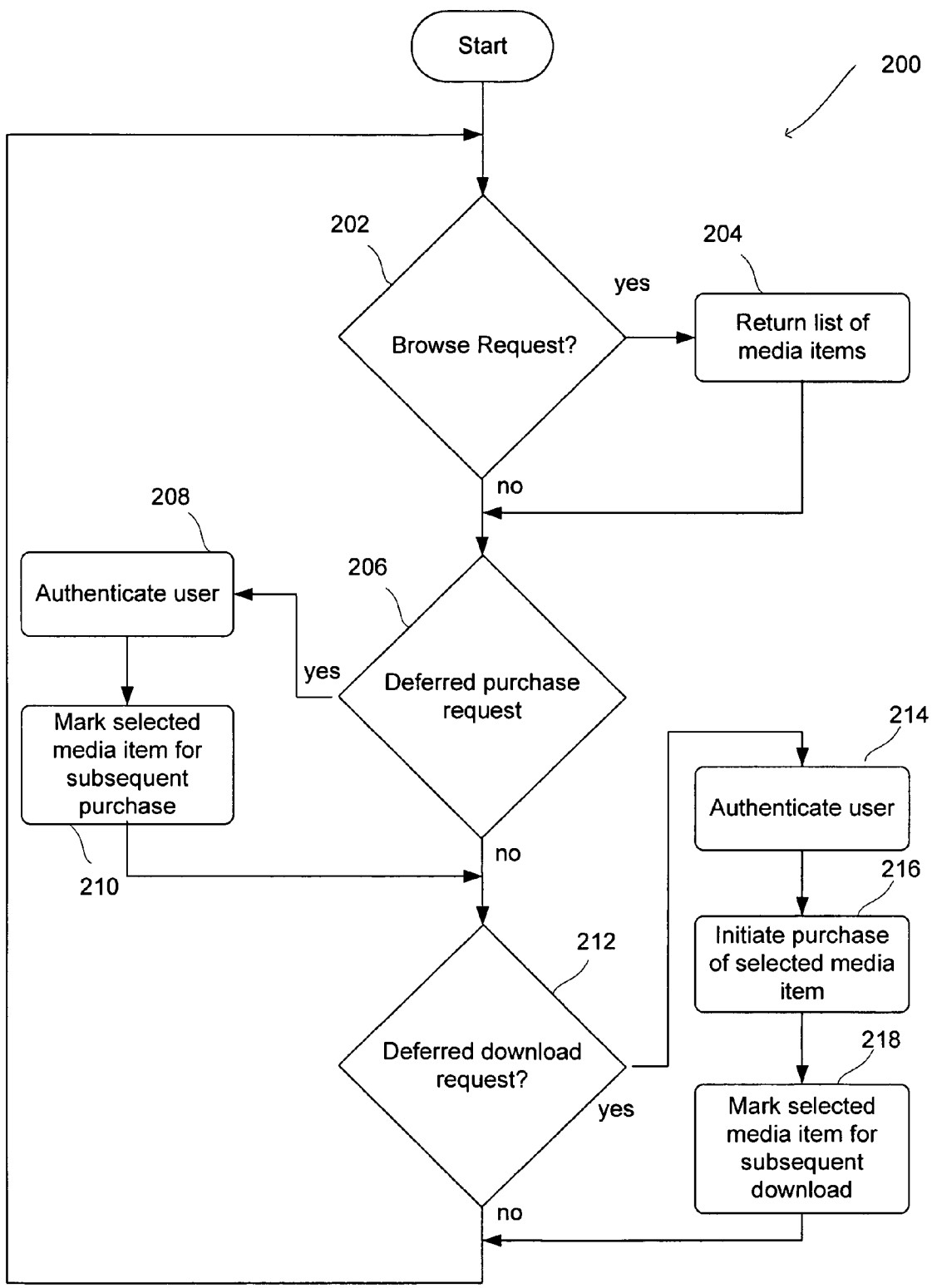
FIG. 2A is a flow diagram of a media selection process according to one embodiment of the invention.

FIG. 2A is a flow diagram of a media selection process 200 according to one embodiment of the invention. The media selection process 200 is, for example, performed by an online media store server when interacting with a client device. For example, the online media store server can be the online media store server 102 illustrated in FIG. 1, and the client device can be the first client device 104 illustrated in FIG. 1. In this embodiment, the client device can also be considered a non-transfer device.

The media selection process 200 begins with a decision 202 that determines whether a browse request has been received at the online media store server. When the decision 202 determines that a browse request has been received, a list of digital media items is returned 204 to the client device. Following the block 204 or the decision 202 when the decision 202 determines that a browse request has not been received, a decision 206 determines whether a deferred purchase request (or interest indicator) has been received at the online media store server. When the decision 206 determines that a deferred purchase request has been received, the user of the client device is authenticated 208. For example, the authentication may require the user to input a user name and/or password. Next, a selected digital media item is marked 210 for subsequent purchase. Here, the deferred purchase request identifies a selected digital media item that is presumably of interest to the user of the client device. In one embodiment, the selected digital media item is marked 210 at the online media store server with reference to an account of the user so that it may be subsequently purchased. In one embodiment, the marking 210 causes an interest indicator for the selected digital media item to be stored at the online media store. Alternatively, when the decision 206 determines that a deferred purchase request has not been received, the blocks 208 and 210 are bypassed.

Next, following the block 210 or the decision 206 when a deferred purchase request has not been received, a decision 212 determines whether a deferred download request has been received. When the decision 212 determines that a deferred download request has been received, the user is authenticated 214. Again, as an example, the user can be authenticated by requiring the user to enter a user name and/or password. Then, purchase of the selected digital media item is initiated 216. Here, the user interacting at the client device requests that the selected digital media item be purchased. The user, after being authenticated, is known by the online media store server, such that the user's account can be debited for the purchase being made. The selected digital media item is thereafter marked 218 for subsequent download. Alternatively, when the decision 212 determines that a deferred download request has not been received, the blocks 214-216 are bypassed.

In any case, following the block 218 or following the decision 212 when a deferred download request has not been received, the media selection process 200 can return to repeat the decision 202 and subsequent blocks. However, it should be noted that the media selection process 200 can further include various other processing operations for different types of requests. For example, another type of request can be a request to mark for review a selected digital media item. Here, the user of a first device would, using the first device, mark a selected digital media item, but would not indicate a desire to purchase the selected digital media item, such that the user of a second device would review the selected digital media item and possibly purchase it at that time. Various other processing operations can also be performed. For example, an audio file, such as a ring tone, associated with the selected digital media item can also be made available for download by the user of the first device or the second device.

Figure 2B:
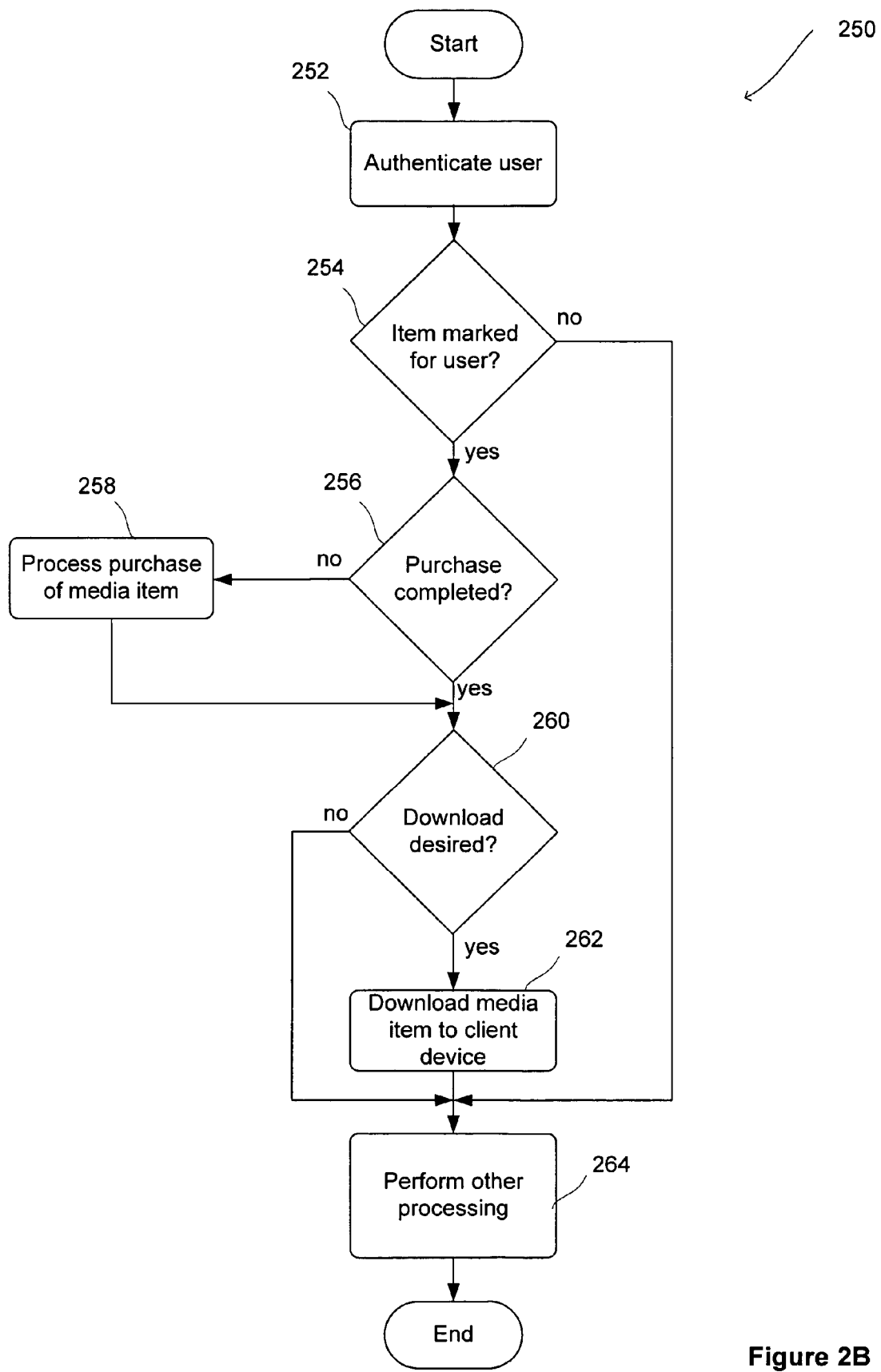
FIG. 2B is a flow diagram of a media download process according to one embodiment of the invention.

FIG. 2B is a flow diagram of a media download process 250 according to one embodiment of the invention. The media download process 250 is, for example, performed by an online media store server when interacting with a client device. For example, the client device can be the second client device 106 illustrated in FIG. 1. Typically, the client device is a device that desires to store the digital media item for subsequent playback or other use. In this embodiment, the client device can also be considered a transfer device.

The media download process 250 initially authenticates 252 the user of the client device. Assuming successful authentication, a decision 254 then determines whether a digital media item is marked for the user (e.g., whether an interest indicator for the digital media item has been stored on the server). When the decision 254 determines that a digital media item is marked for the user, a decision 256 determines whether purchase of the digital media item that is marked has been successfully completed. When the decision 256 determines that purchase for the digital media item has not been completed, then purchase of the digital media item is processed 258. Thereafter, following the block 258 or following the decision 256 when the purchase has previously been completed, a decision 260 determines whether download of the digital media item is desired. Here, in one embodiment, the user of the client device can determine whether they desire to receive the download of the digital media item at this time. When the decision 260 determines that the download of the digital media item is desired, then the digital media item is downloaded 262 to the client device. Alternatively, when the decision 260 determines that download is not desired at this time, the block 262 is bypassed so that the digital media item is not downloaded to the client device at this time. Alternatively, when the decision 254 determines that there is no digital media item marked for the user, then the media download process 250 bypasses blocks 256-262. Hence, following the block 262 or its being bypassed via the decision 254 or 260, other processing can be performed 264. One example of other processing is to play the downloaded digital media item at the client device. Following the block 264, the media download process 250 is complete and ends.

Figure 3A:
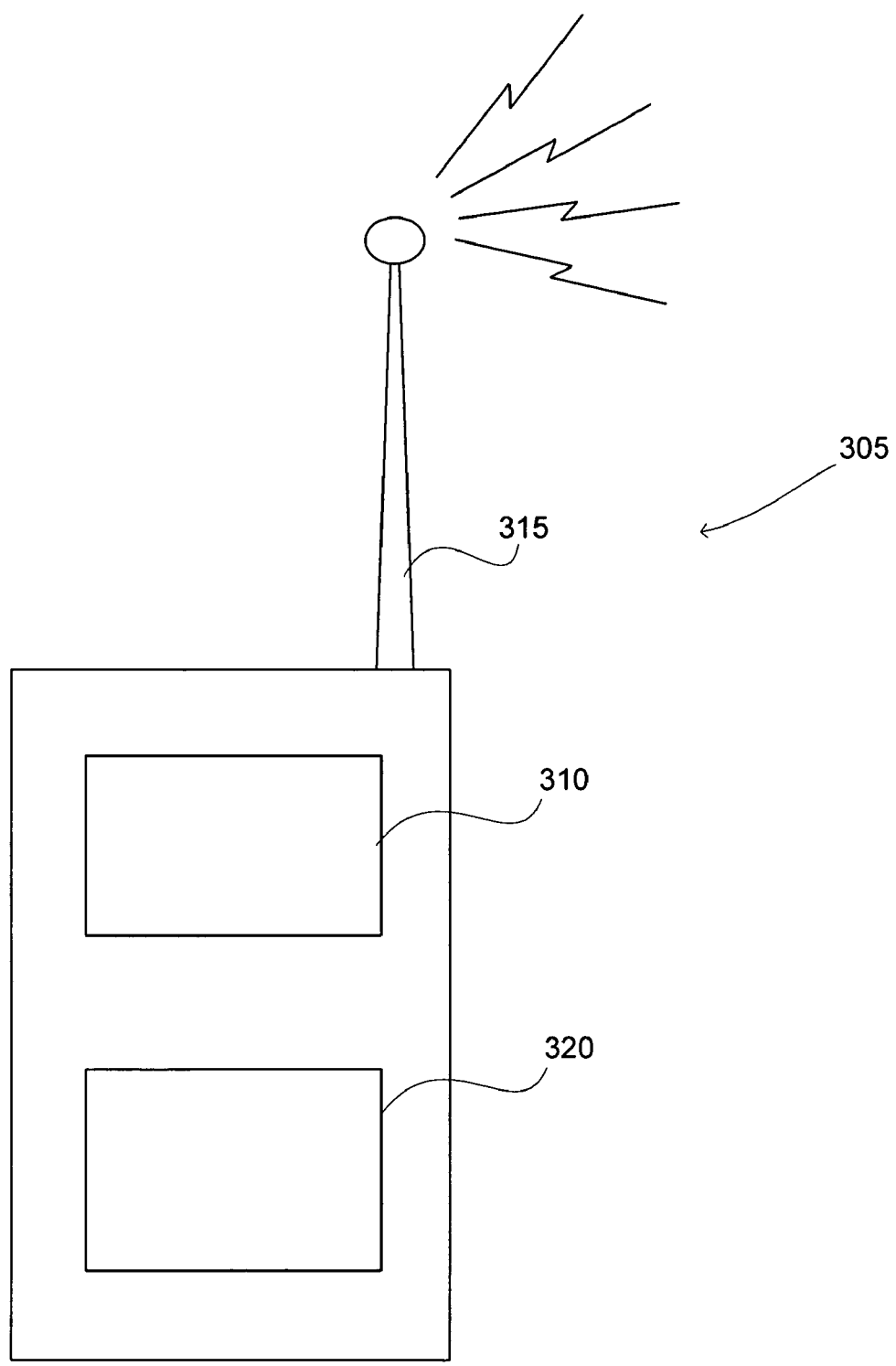
FIG. 3A shows a generalized device suitable for use as a portable wireless device according to one embodiment of the invention.

FIG. 3A shows a generalized device suitable for use as a portable wireless device 305 (non-transfer device) according to one embodiment of the invention. The portable wireless device 305 includes a display 310 used to view text or graphics, an antenna 315 for connecting to a wireless network such as a cellular phone network or wireless data network, and a control panel 320 such as a keypad or touchpad. Browsing, marking and/or purchasing media items according to several of the embodiments detailed in this application may be accomplished by using a browser application such as a WAP browser (not shown). Additionally, portable wireless device 305 contains one or more of the following (not shown): one or more speakers, a microphone, a headphone jack, a port for connecting with a transfer device (e.g., FireWire® or USB port), one or more slots to accept flash memory cards (e.g., CompactFlash (CF) or SmartMedia (SM) cards), and one or more antennae or ports used to connect to a local networks, for example, Bluetooth®, infrared (IR), or WiFi (IEEE 802.11). Contained within portable wireless device 305 is system memory (not shown), which may include both volatile and nonvolatile memory and, optionally, a hard drive (not shown).

Figure 3B:
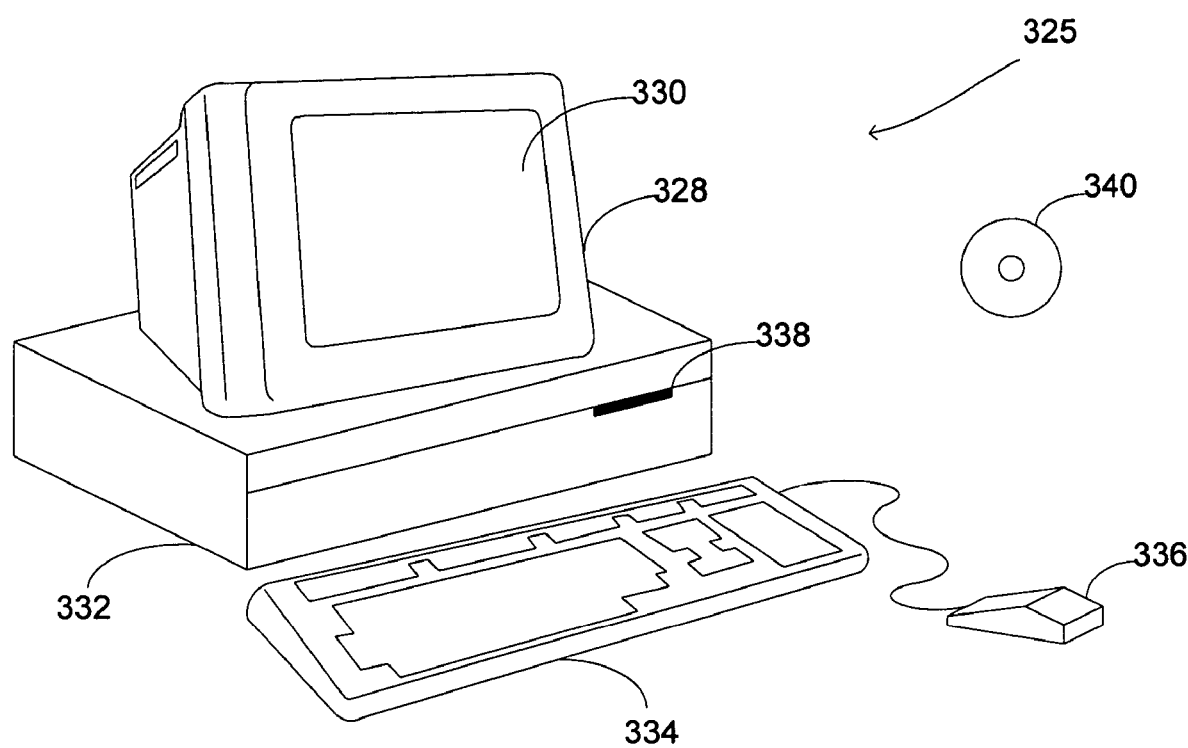
FIG. 3B shows a generalized computer system appropriate for use as a host computer according to one embodiment of the invention.

FIG. 3B shows a generalized computer system 325 appropriate for use as a personal computer (transfer device) according to one embodiment of the invention. Computer system 325 includes a display monitor 328 having single or multi-screen displays 330 (or multiple displays), cabinet 332, keyboard 334, and mouse 336. Cabinet 332 houses a drive 338, such as a CD-ROM or floppy drive, system memory and a hard drive (not shown) which may be utilized to store and retrieve software programs incorporating computer code that implements the present invention, data for use with the invention, and the like. Although CD-ROM 340 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 325 is provided in the system memory, the hard drive, the CD-ROM 340 or other computer readable storage medium and serves to incorporate the computer code that implements the invention.

Figure 4A:
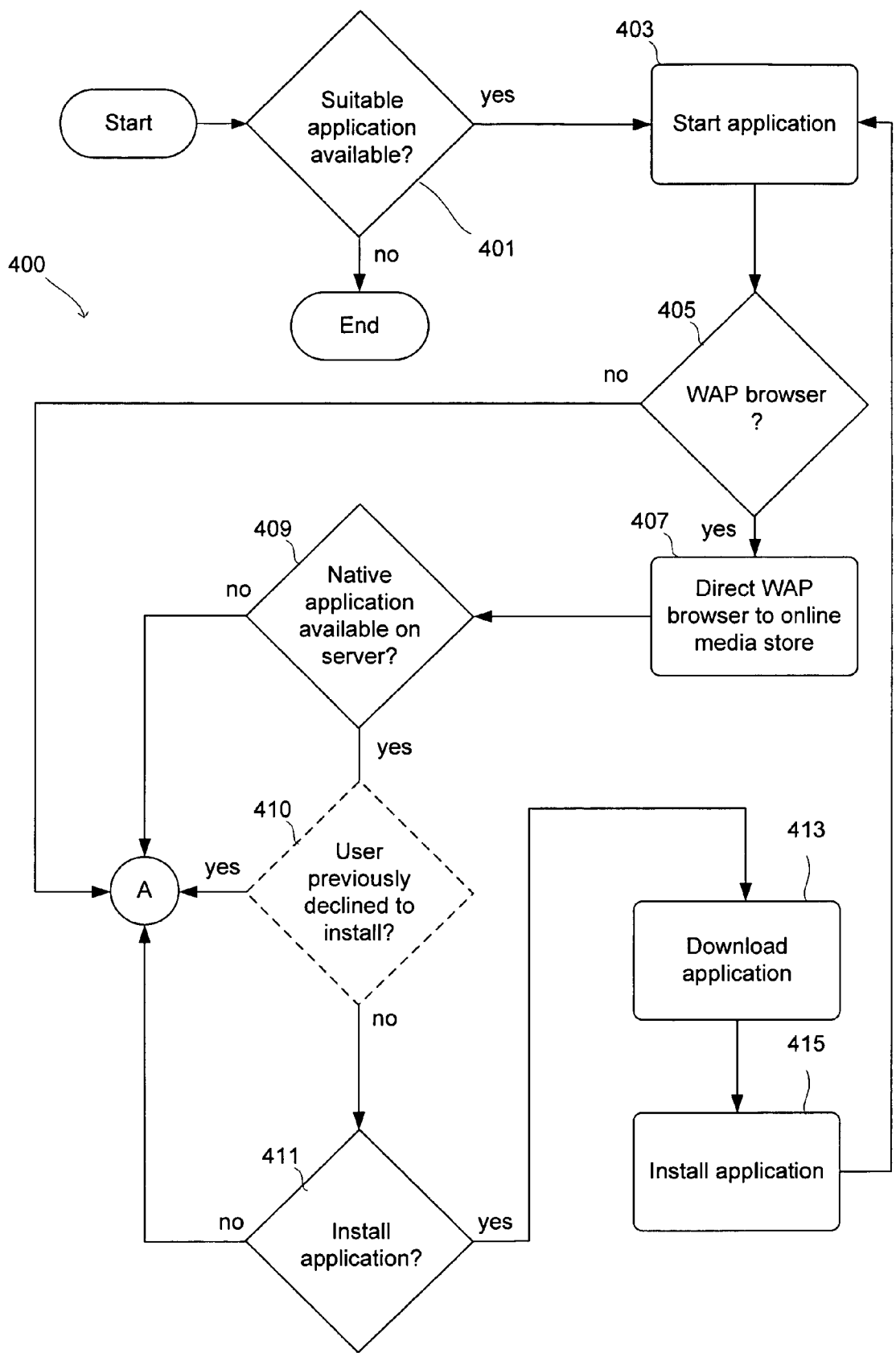
FIGS. 4A and 4B illustrate a client-side digital media item reservation process according to one embodiment of the invention.

FIG. 4A illustrates a flow diagram of a client-side digital media item reservation process 400 according to one embodiment of the invention. This embodiment uses a Wireless Application Protocol (WAP) compatible browser or another application suitable for wireless interaction with an online media store. Client-side digital media item reservation process 400 begins with decision 401, which determines if at least one suitable application is available (e.g., a portable wireless device). Besides a WAP browser, other suitable applications include native (platform dependent) and non-native (platform-independent) applications which either come pre-installed on the device or are installed by the device user. Suitable applications may be obtained and installed using a wide variety of methods. For example, a user can download the application over a computer network (or copy it from a removable storage media such as a CD ROM) onto a personal computer and install the application on the client device via a physical link (e.g., a cable) or a wireless connection (e.g., Bluetooth® or IR). Alternately, the application can be downloaded over a wireless network (or copied from a removable storage media such as a flash card). Further, the application can be transferred between client devices using a physical link or a wireless connection. Other ways to obtain a suitable application are possible and will readily occur to those skilled in the art.

Returning to FIG. 4A, if decision 401 determines that at least one application suitable for wireless communication with an online media store is available, client-side digital media item reservation process 400 continues with the user starting 403 a suitable application from a list of available applications (if more than one is available). Otherwise, if no suitable application is available, then process 400 ends. Note that, if both a WAP browser and one or more suitable native applications are available, then the user may choose any of them according to his or her preference. Next, a decision 405 determines if the selected application is a WAP browser. If so, the browser is directed 407 to an online media store, for example, directly or by the user selecting a hyperlink or inputting a uniform resource locator (URL).

When discussing native applications for specific portable wireless devices, it is noted that many wireless-enabled PDAs and cellular phones have the capacity to run native applications, thus allowing third-party developers to create applications which more efficiently utilize the capabilities of a particular platform than is possible with a platform-independent application. Examples include cellular phones and PDA's running the Palm OS® or Windows® operating systems for mobile devices. Other alternatives include portable wireless devices running Nokia Corporation's Symbian OS® or Qualcomm's Binary Runtime for Wireless Environment® (BREW™). Many of these portable wireless devices are also able to run non-native (i.e., platform-independent) applications such as, for example, JAVA™ applets. It is generally understood, however, by those skilled in the art that non-native software is often less suitable than native software in many situations, such as when the software needs to be able to play media files. This problem is primarily due to limitations in current platform-independent software platforms, which are likely to improve in the foreseeable future. Accordingly, according to this particular embodiment of the invention, native applications are currently preferred over non-native applications. It is foreseeable that non-native applications will soon be well-suited for the purposes of the present invention. Thus, although the use of non-native applications will not be discussed further, it is understood for the purposes of this application that the invention is suitable for use with non-native applications.

A user may prefer to use a native software application over a WAP browser for a variety of reasons. A native application designed specifically for communication with an online media store will likely have an improved user interface, the capability to play a wider variety of media types, improved download and file management, and other advantages which might be lacking in a general-purpose browser application.

Returning to FIG. 4A, once the user has directed 407 the WAP browser to the online media store, client-side digital media item reservation process 400 continues to decision 409, which determines if a suitable native software application is available for the portable wireless device. This determination 409 can be automatic due to, for instance, a communication between the portable wireless device and the online media store server, or initiated by the portable wireless device user, who may be given the option to search (not shown) the media store for device-specific software. Optional decision 410 follows, wherein process 400 determines if the user has previously declined to install a native application for the portable wireless device. Decision 410 can be implemented in the case that decision 409 occurs automatically, so as to prevent the user or portable wireless device from having to repeatedly answer the query posed by decision 411 every time the online media store is revisited. If decision 410 determines that the user has previously declined to install an available native software application, then process 400 skips decision 411 and continues to transition 'A' and subsequent blocks (discussed below). Alternately, decision 410 can direct the user or portable wireless device to decision 411 periodically (e.g., after a pre-set time period or when a new version of the native software application is available).

If a suitable native software application is available and decision 410 is affirmative, then decision 411 queries the user of the portable wireless device to determine if the user wants to install the native software application. If the user elects to install the application, the user is directed to download 413 and install 415 the application. Once the native software application has been installed, process 400 returns to block 403 and subsequent blocks.

Returning to decision 405 in FIG. 4A, if the application selected by the user in block 403 is a native application, then the selected native application is directed 409 to the online media store, either in a manner similar to that described for the WAP browser in operation 407, or according to directions which have been preprogrammed into the application (by the software developer or by the user). Next, process 400 continues to transition 'A' and subsequent blocks.

Returning to decision 411 in FIG. 4A, if it is determined that the user does not want to install a native application, then process 400 continues to transition 'A' and subsequent blocks.

Figure 4B:
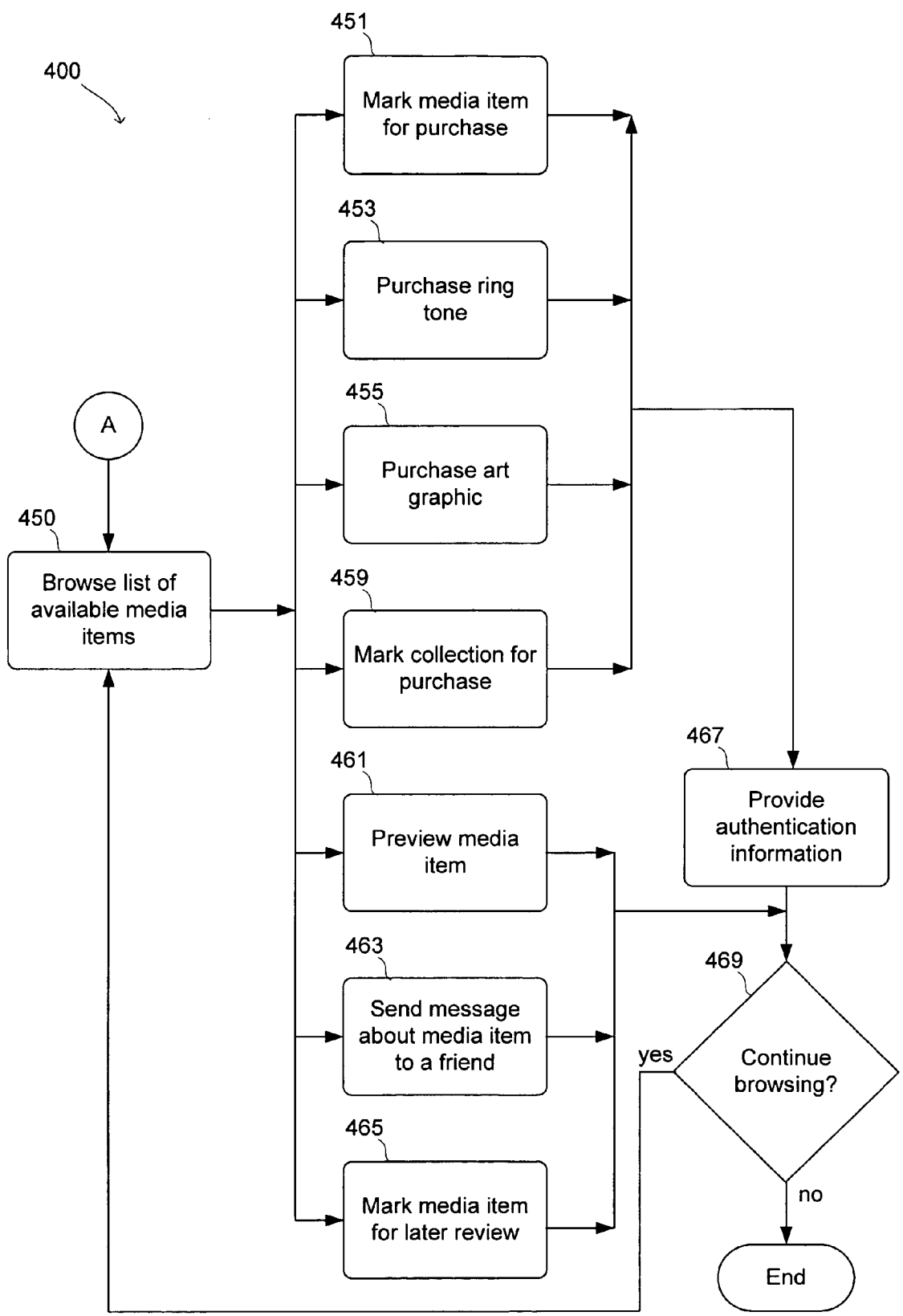

Once client-side digital media item reservation process 400 reaches transition 'A' (via operation 409, or via decisions 410 or 411), it continues on to operation 450 and subsequent blocks, which are illustrated in FIG. 4B. In particular, client-side digital media item reservation process 400 continues after transition 'A', allowing the user to use the current application, which can be a WAP browser or native software application as described above, to browse 450 a list of available digital media items. In one embodiment of the invention, digital media items available for download from the media store are selected according to a media selection process 500, discussed below in reference to FIG. 5. Digital media item types can include, for example, music singles, music albums, videos, motion pictures, and electronic books (eBooks). Additionally, if the portable wireless device has cellular phone features, the list may include ring tones compatible with the make and model of that particular portable wireless device.

Next, the user selects from a list of choices represented by operations 451 through 465. The list of operations is exemplary only and is not intended to be a comprehensive listing of all possible choices. Other choices may be added without changing the scope of the invention. Also, not all of the operations 451 through 465 need be presented in the list of choices.

Operations 451, 453, 455, and 459 each represent commercial transactions. A user may, for example, choose to mark 451 a digital media item for purchase (e.g., store an interest indicator for the digital media item), purchase 453 a ring tone, purchase 455 an electronic copy of a picture or graphic, or mark 459 a collection of digital media items for purchase.

Marking 451 a digital media item for purchase allows the user to select and pay for a digital media item using the portable wireless device. However, the digital media item is not downloaded to the portable wireless device in this case. Instead, the digital media item is marked by the media store as a purchased digital media item for subsequent download. At some point in the future, when the user logs on to the online media store with a personal computer (transfer device), the media store will alert the user that a previously purchased digital media item is available for download.

Purchasing 453 a ring tone is an available option for portable wireless devices which incorporate telephone or alarm capabilities. In one embodiment of the invention, ring tones available for download from the media store are selected according to a media selection process 500, discussed below in reference to FIG. 5. Ring tones purchased 453 may be downloaded immediately or at some future time, according to the user's preference. Alternately, ring tones may be automatically downloaded to the portable wireless device during off-peak hours, thus allowing a user who has selected a wireless usage plan that charges less for off-peak downloads to take advantage of cheaper rates without having to complete the purchase 453 during peak hours.

Purchasing 455 an art graphic (e.g., an electronic image such as a JPEG) functions similarly to purchasing 453 a ring tone. However, the user may choose to purchase an art graphic for download to the portable wireless devices or mark the art graphic for download to a personal computer at a later time, much like marking 451 a digital media item for purchase, described above.

Marking 459 a collection of digital media items for purchase functions similarly to the marking in operation 451. However, marking 459 can allow the user to mark multiple items in a collection (e.g., a music album) at the same time. Marking 459 a collection of digital media items might be advantageous to the user in terms of pricing (i.e., a discount for buying multiple items at once). Note that any combination of digital media items may be contained within a collection. For example, a user can purchase a complete package associated with a particular music single which includes the download of a ring tone and a graphic file for the portable wireless device, and the marking of a high quality music file, a high quality graphic, and a high quality music video file for download.

Operations 461, 463, and 465 each represent non-commercial transactions. A user may, for example, choose to preview 461 a digital media item, send 463 a message about a digital media item, or mark 465 a digital media item for future review.

A preview 461 can be, for example, a short, low quality snippet of an available digital media item, and can be streamed or downloaded to the portable wireless device. Some clients may not be capable of previewing 461 one or more media file types, so this option will not always be available to all portable wireless devices.

Messages sent 463 to a friend regarding one or more of an available digital media items in the list can be, for example, e-mail messages including text and/or graphics, text messages, or multimedia messages. See, for example, U.S. patent application Ser. No. 10/910,555, filed Aug. 2, 2004, and entitled "Method and System for Sharing Information about Media Items", which is hereby incorporated herein by reference.

Marking 465 of one or more digital media items for review allows a user to defer reviewing a digital media item until a later time. When the user logs on to the media store using a personal computer, the user will receive a message or some other notification that one or more digital media items have been marked for review.

If any commercial transaction is selected (including, but not limited to commercial transactions represented by operations 451, 453, 455, and 459), client-side digital media item reservation process 400 continues to operation 467, where the user provides authentication information, such as user name and password, in order to authorize the purchase. Another method of authentication is by directly using a user's cellular phone account information and a personal identification number (PIN). Other known user authentication procedures may also be used. Once any non-commercial transaction is completed (including, but not limited to, non-commercial transactions represented by operations 461, 463, and 465) are performed, process 400 continues to decision 469 and subsequent blocks. Next, decision 469 determines if the user wants to continue browsing and/or shopping. If so, client-side digital media item reservation process 400 returns to perform block 450 and subsequent blocks. If no, process 400 ends.

Figure 5:
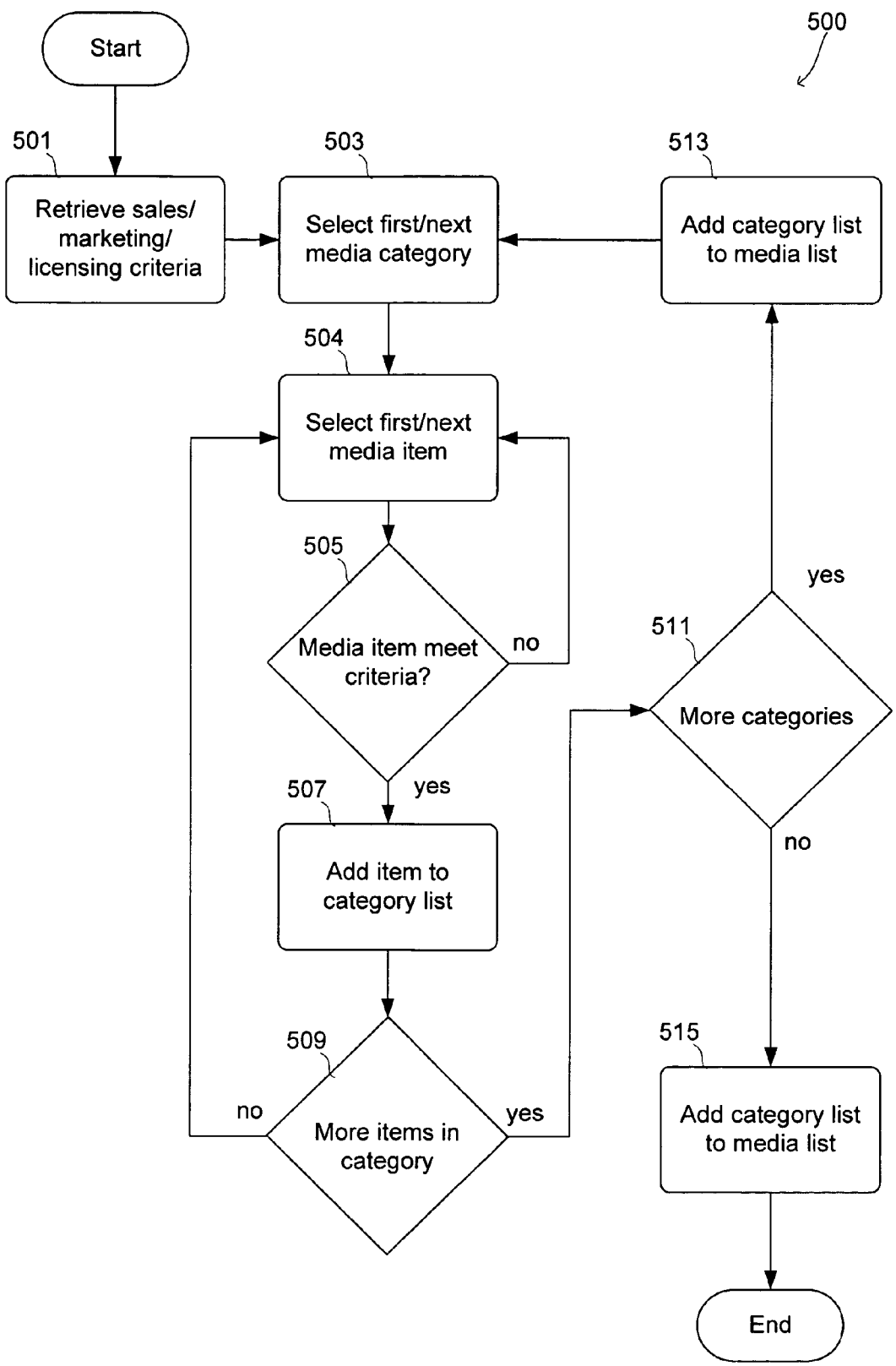
FIG. 5 is a flow diagram of a media selection process according to one embodiment of the invention.

FIG. 5 illustrates a flow diagram of a media selection process 500 according to one embodiment of the invention. Media selection process 500 serves to produce a subset of digital media items (e.g., the 'media selections list') available from a primary online media store (which is only accessible by personal computers) for use in a secondary online media store (which is typically only accessible by portable wireless devices). This is useful due to the limitations of many portable wireless devices, both in terms of processing/storage and data bandwidth available for downloading. In order to account for these limitations, marketing/sales/licensing criteria are used to determine which digital media items will be available for selection by a user accessing a secondary online media store using a portable wireless device. For instance, the criterion used might be the most popular digital media items available at the online media store. Alternately, a digital media item that is being aggressively marketed may be included in the criteria, in spite of the fact that is not popular. Licensing criteria is included because not every digital media item may be licensed for all media categories. By way of specific example, not every song which is downloadable for playback on a media player may be licensed for download as a ring tone on a cellular phone.

Media selection process 500 begins by obtaining 501 marketing/sales/licensing criteria for selection for use in creating the media selections list. The criteria may have been previously entered (e.g., manually, or by a system administrator) or can be derived from statistical sales data taken from a primary online media store. The process 500 continues by selecting 503 a media category (e.g., popular music), followed by selecting 504 an item in that particular media category. Next, decision 505 determines whether the currently selected item meets the criteria for selection. If the digital media item meets the criteria, the item is added 507 to a temporary sub-list (e.g., the 'media category selections list'). If the digital media item does not meet the required criteria, then decision 505 returns process 500 to operation 503 and subsequent blocks. Returning to operation 507, once a digital media item has been added to the media category selections list, decision 509 determines if more digital media items are available in the currently selected media category. If so, decision 509 returns process 500 to operation 503 and subsequent blocks. On the other hand, if no more items are available in the category, the process continues to decision 511, which, in turn, determines whether or not there are more media categories to be examined. If more categories are available, then process 500 adds 513 the list of digital media items for that particular category to the digital media item selections list and returns to operation 503 and subsequent blocks. Alternately, the category selections list is added 515 to the digital media item selections list and media selection process 500 ends. The result is a list of digital media items selected to be featured on a secondary online media store, arranged by category. Of course, other list arrangements are possible.

Figure 6:
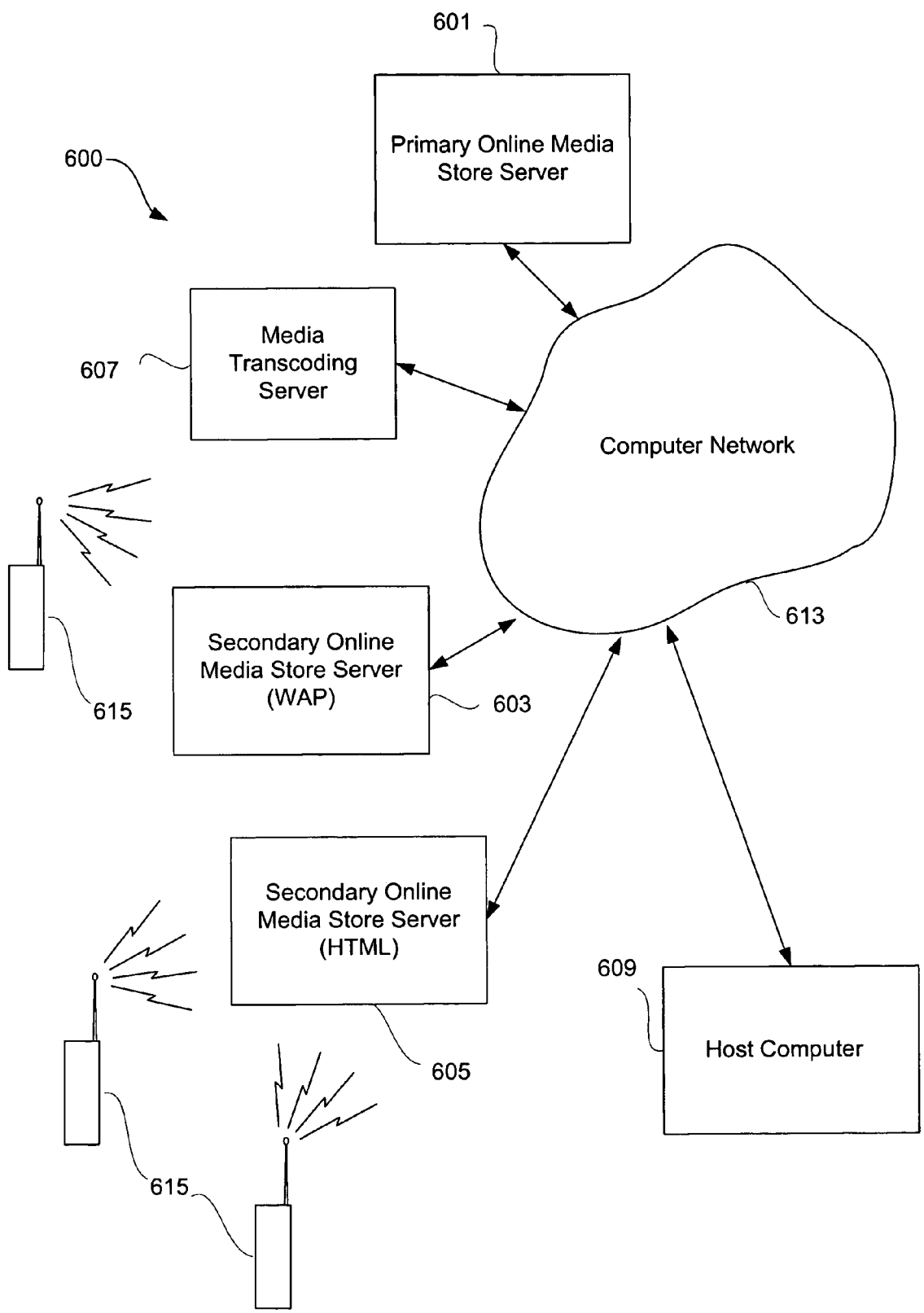
FIG. 6 is a block diagram of a multi-device media purchase system according to one embodiment of the invention.

FIG. 6 is a block diagram of a computing environment 600 according to one embodiment of the invention. The computing environment 600 includes one or more computer servers, including at least one primary online media store server 601, one or more secondary online media store servers, which can be, for example, Wireless Application Protocol (WAP) servers 603, or HTML servers 605. Primary online media store servers 601 are configured to communicate with personal computers 609 via a computer network 613 (e.g., the Internet). Secondary media store servers 603 and 605 are configured to communicate with portable wireless devices 615 (such as cell phones). Additionally, one or more media transcoding servers 607, which are used to convert media file formats, may be connected to computer network 613. Media transcoding servers 607 are used to convert one media format to another. For instance, a file in MP3 format may be transcoded into AAC, WMA, or a ring tone format. Similarly, a music file may be converted into a MIDI file. Alternately, a high quality media file may be converted into a low quality media file.

Typically, computing environment 600 includes a plurality of different personal computers 609, which are connected to at least part of data network 613. Personal computers 609 are typically classified as transfer devices. Portable wireless devices 615 are typically classified as non-transfer devices. Depending on the capabilities of individual portable wireless devices 615, connections will be made to compatible secondary media store servers. For example, some portable wireless devices 615 can only connect to WAP enabled secondary media store servers 603. Other portable wireless devices can only connect to HTML enabled secondary media store servers 605. A third category of portable wireless device can connect to either WAP or HTML servers. A fourth possible category is able to connect directly to primary online media store servers 601. Portable wireless devices of this type are considered transfer devices and are classified as personal computers 609 for the purposes of this application. The various servers 601-607 can be remotely located on multiple computer systems or centrally located on a common computer system.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random-access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for identifying a digital media item of interest that is one of a plurality of digital media items available for download from an online media store, said method comprising:

interacting with the online media store via a first device to identify a digital media item of interest to a user of the first device;

marking the digital media item of interest at the online media store with an interest indicator;

storing, at the online media store, the interest indicator for the marked digital media item of interest for subsequent downloading; and subsequently downloading, to a second device when the second device interacts with the online media store, the digital media item of interest indicated by the interest indicator.

2. A method as recited in claim 1, wherein said interacting is over a low-bandwidth network, and said downloading is over a high-bandwidth network.

3. A method as recited in claim 1, wherein said marking is at the request of the user of the first device.

4. A method as recited in claim 1, wherein said method further comprises:

downloading, to the second device, an additional digital media item that is associated with the digital media item of interest as previously marked by the user of the first device.

5. A method as recited in claim 4, wherein the additional digital media item is a ring tone.

6. The method of claim 5, wherein the first device is a cellular phone or a personal digital assistant (PDA).

7. The method as recited in claim 1, wherein the first device is a portable wireless device.

8. The method as recited in claim 1, wherein the first device operates a wireless browser to assist the user of the first device with said interacting with the online media store.

9. The method as recited in claim 1, wherein the second device operates a browser application to assist the user with said interacting with the online media store and said subsequent downloading of the digital media item of interest from the online media store to the second device.

10. The method as recited in claim 1, wherein the second device is a personal computer.

11. The method as recited in claim 1, further comprising:

determining, at the online media store, if a media management application is available for the first device;

downloading, from the online media store, a media management application;

installing the media management application on the first device; and wherein said interacting comprises marking a digital media item for purchase using the media management application.

12. The method as recited in claim 1, wherein the digital media item is selected from the group consisting of a music single, a music video, an electronic book (eBook), and an art graphic.

13. The method as recited in claim 12, wherein the digital media item is a compilation of digital media items.

14. The method as recited in claim 2, wherein the interacting further comprises connecting to a high-bandwidth network using a gateway after connecting to the low-bandwidth network.

15. The method as recited in claim 14, wherein an online media server host the online media store, and wherein the interest indicator is stored at the online media server with reference to a user account associated with the user of the first device.

16. The method as recited in claim 1, wherein the interest indicator is a review indicator or a purchase indicator.

17. The method as recited in claim 1, wherein the subsequently downloading further comprises authenticating the user of the first device.

18. The method as recited in claim 1, wherein the subsequently downloading further comprises authenticating the user of the second device.

19. The method as recited in claim 1, wherein the interacting further comprises purchasing the digital media item of interest, and wherein the marking further comprises indicating the digital media item of interest is a purchased digital media item for subsequent downloading.

20. A method for identifying a digital media item of interest that is one of a plurality of digital media items available for download from an online media store, said method comprising:
  interacting with the online media store over a low-bandwidth network via a first device to identify a digital media item of interest to a user of the first device;
  marking the digital media item of interest at the online media store with an interest indicator;
  storing, at the online media store, the interest indicator for the digital media item of interest for subsequent downloading;
  subsequently downloading over a high-bandwidth network, to a second device when the second device interacts with the online media store, the digital media item of interest indicated by the interest indicator; and
  downloading, to the second device, an additional digital media item that is associated with the digital media item of interest as previously marked by the user of the first device.

21. The method as recited in claim 20, wherein the first device is a portable wireless device.

22. The method as recited in claim 20, wherein the second device is a personal computer.

23. The method as recited in claim 20, wherein the digital media item is selected from the group consisting of a music single, a music video, an electronic book (eBook), and an art graphic.

24. The method as recited in claim 23, wherein the digital media item is a compilation of digital media items.

25. The method as recited in claim 20, wherein the interacting further comprises connecting to a high-bandwidth network using a gateway.

26. The method as recited in claim 20, wherein an online media server host the online media store, and wherein the interest indicator is stored at the online media server with reference to a user account associated with the user of the first device.

27. The method as recited in claim 20, wherein the marking further comprises indicating that the digital media item is for review or purchase.

28. The method as recited in claim 20, wherein the subsequently downloading further comprises authenticating the user of the first device.

29. The method as recited in claim 20, wherein the subsequently downloading further comprises authenticating the user of the second device.

30. A program storage device readable by a machine tangibly embodying a program of instructions executable by the machine to perform a method for identifying a digital media item of interest that is one of a plurality of digital media items available for download from an online media store, the method comprising:
  interacting with the online media store via a first device to identify a digital media item of interest to a user of the first device;
  marking the digital media item of interest at the online media store with an interest indicator;
  storing, at the online media store, the interest indicator for the marked digital media item of interest for review at a later date; and
  subsequently downloading, to a second device when the second device interacts with the online media store, the digital media item of interest indicated by the interest indicator.

* * * * *